United States Patent [19]

Kawabata et al.

[11] 4,218,263
[45] Aug. 19, 1980

[54] PROCESS FOR PREPARING OXYGEN-CONTAINING WAXES

[75] Inventors: Nobuaki Kawabata; Nobuo Yokoyama, both of Yokohama, Japan

[73] Assignee: Nippon Oil Company, Ltd., Tokyo, Japan

[21] Appl. No.: 961,783

[22] Filed: Nov. 17, 1978

[30] Foreign Application Priority Data

Dec. 12, 1977 [JP] Japan .................................. 52-148211

[51] Int. Cl.$^2$ ..................... C07D 307/60; C08L 91/06
[52] U.S. Cl. ............................... 106/270; 260/346.74; 562/595; 560/190; 260/326.5 F; 260/561 N
[58] Field of Search .................. 260/346.74; 562/595; 106/270; 565/526 (U.S. only)

[56] References Cited

U.S. PATENT DOCUMENTS 3,590,076  6/1971  Heintzelman et al. .......... 260/346.74

*Primary Examiner*—Henry R. Jiles
*Assistant Examiner*—Bernard Dentz
*Attorney, Agent, or Firm*—Jordan and Hamburg

[57] ABSTRACT

A process for preparing an oxygen-containing wax obtained by reacting a mixture of saturated and unsaturated hydrocarbon waxes with an unsaturated polycarboxylic acid thereby to prepare the oxygen-containing wax. In one embodiment, this invention relates to the oxygen-containing waxes so prepared.

17 Claims, 2 Drawing Figures

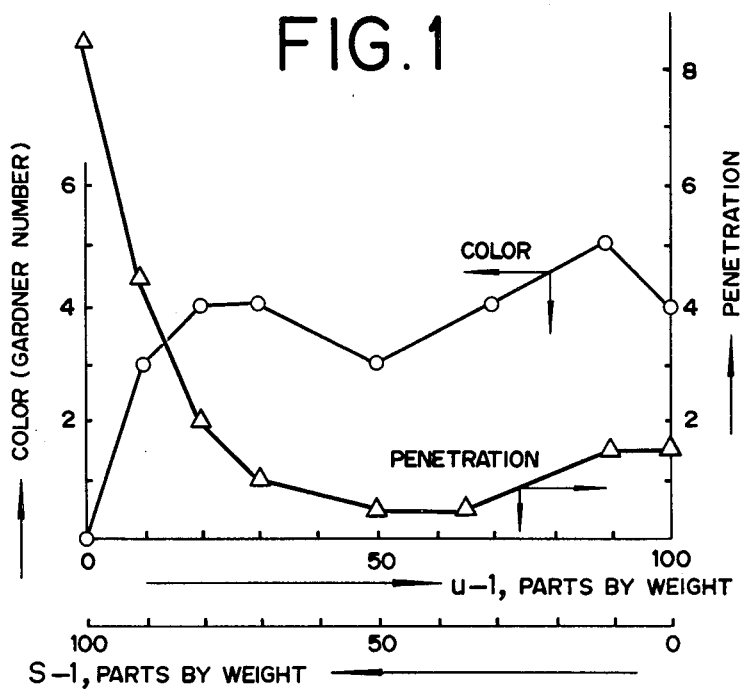
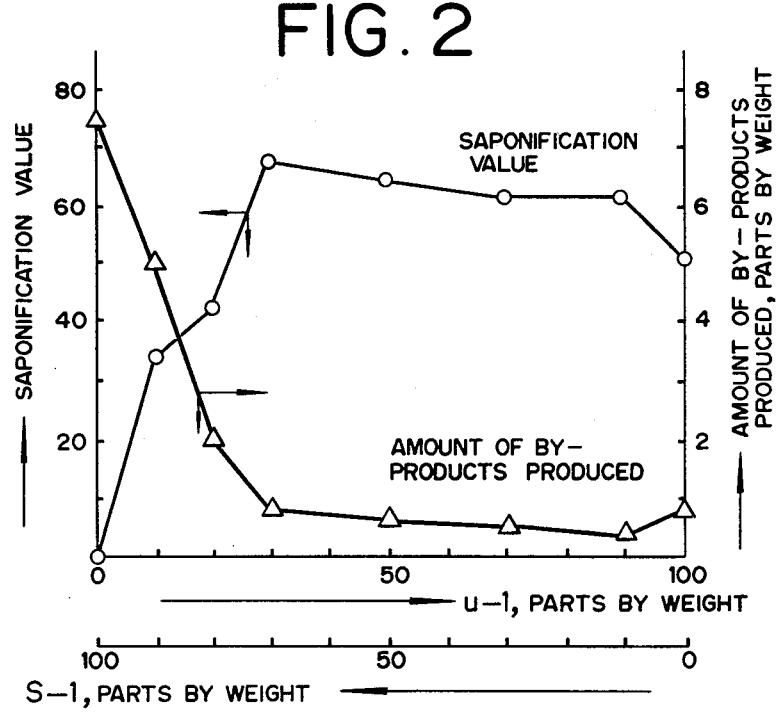

PROCESS FOR PREPARING OXYGEN-CONTAINING WAXES

This invention relates to a process for the preparation of novel oxygen-containing waxes which are quite different in type or quality from conventionally used natural wax, oxygen-containing waxes and the like. More particularly it relates to a process for preparing excellently emulsifiable, hard and glossy oxygen-containing waxes obtained by addition reacting a hydrocarbon wax with an unsaturated polycarboxylic compound. In modifying a hydrocarbon wax by addition reacting it with maleic anhydride or the like, the use of a saturated hydrocarbon wax and an unsaturated hydrocarbon wax in mixture as the starting wax will result in easily obtaining an oxygen-containing wax having excellent properties since it produces desirable synergistic effects which are not obtainable by maleinization of each of the waxes, this embodying this invention.

In attempts to obtain waxes having properties similar or superior to those of heretofore generally used natural wax, oxidized waxes and the like, there have heretofore been proposed many methods comprising addition reacting a hydrocarbon wax with maleic anhydride, crotonic acid or the like to obtain a modified hydrocarbon wax.

Among the methods so proposed, a method in which is used a hydrocarbon wax containing unsaturation bonds in a sufficient amount, when used, will permit a reaction between a starting hydrocarbon wax and an unsaturated carboxylic acid or anhydride thereof to proceed only by mixing the reactants together and heating the mixture under agitation since an unsaturated carboxylic acid such as maleic anhydride or crotonic acid can easily combine thermally with the unsaturation bonds of the wax, whereby an oxygen-containing wax is obtained. In order to permit said reaction to proceed at a reasonable velocity, it is necessary to use a reaction temperature in the range of at least 220° C. At a temperature of this range, the formation of tarry materials due to the side reaction of the acid or anhydride thereof, the coloration of the main product, the decomposition of the acid or anhydride thereof and, in some cases, the decomposition of the starting wax itself, as well as other undesirable phenomena will generally take place simultaneously with the desired reaction. To avoid these disadvantages, it is recommendable to effect the reaction at an increased velocity and at a temperature in the range of less than 220° C. by using a suitable catalyst in, and adding a reaction initiator to, the reaction system; however, the use of these catalyst and initiator as the third components is disadvantageous from the viewpoint of economy and the like. Thus, it is a problem to be technically determined in each case whether the reaction should be thermally effected at a high temperature alone or at a lower temperature in the presence of such accelerating agents added.

A high reaction temperature is not required in a case where an organic peroxide or the like is added to the reaction system to accelerate the reaction, and a low reaction temperature is rather desired for the same reasons as previously mentioned. The upper limit of the reaction temperature is 220° C. The lower limit of the reaction temperature and the reaction time are determined depending on the decomposability of an organic peroxide used and the reactivity of free radicals liberated therefrom. Thus, the use of a highly reactive organic peroxide permits the reaction to proceed at a low temperature in a short time; however, organic peroxides usable herein are of course limited since such highly reactive ones are generally highly ignitable and explosive and therefore require caution and care in being handled. In view of the reactivity of the organic peroxide used, the suitable reaction temperature and time may be in the range of 120°–220° C. and 0.5–6 hrs, respectively.

Organic peroxides which are sufficiently reactive and safe under the aforesaid reaction conditions acceptable as general ones, include ditertiary-butyl peroxide, tertiary-butyl hydroperoxide, dicumyl peroxide, tertiarybutylcumyl peroxide, cumyl hydroperoxide, 2,5-dimethyl-2,5-di(tertiary-butylperoxy)hexyne-3, and methyl ethyl ketone peroxide, with ditertiary-butyl peroxide being the most preferred from the view-point of reactivity, safety, easiness of handling, cost and the like.

Further, there has also been known a method comprising addition reacting a saturated hydrocarbon wax such as microcrystalline wax, with maleic anhydride or the like (for example, U.S. Pat. No. 3,933,511). In this method, no reaction will take place only by mixing together and heating the reactants and it is therefore necessary to add a reaction initiator such as a peroxide as the third component to the reaction system; however; the use of such a peroxide in this case will cause homopolymerization of the maleic anhydride alone simultaneously with the intended reaction thereby producing viscous resinous materials as by-products. The by-products are required to be removed by, for example, extraction with a large amount of a solvent and, thus, said known method has not yet been established as a feasible one.

In addition, paraffin wax as one of starting saturated hydrocarbon waxes is very advantageous in that it is inexpensive, pure white in color and easily available in a large amount, however, it is low in reactivity since it is composed mainly of straight-chain hydrocarbons. Even if paraffin wax be attempted to be addition reacted with maleic anhdydride by the use of the aforesaid method, there will be obtained a very low efficient introduction of oxygen into the wax with resinous by-products being produced in large amounts. Thus, paraffin wax has never been considered suitable as a starting wax for modification by conventional methods.

To produce waxes of a new type intensive studies had been made by the present inventors by addition reacting various hydrocarbon waxes, whether saturated or unsaturated, with maleic anhydride, with the result that the maleinized waxes so produced had, more or less, specific defects depending upon the quality of the starting wax and the method of reaction used. It was thus considered difficult to produce modified waxes from which such defects were thoroughly eliminated. It has later been found, however, that a saturated wax and an unsaturated wax are mixed together and the resulting mixture is then addition reacted with maleic anhydride (the addition reaction being hereinafter referred to as "maleinization") at a temperature of not higher than 220° C. in the presence of a reaction initiator such as an organic peroxide thereby to easily produce a maleinized or oxygen-containing wax which is light-colored, hard and glossy. The oxygen-containing wax so produced is not only excellent in various basic properties and practical performances such as emulsifiability as compared with any conventional ones obtained by maleinizing a starting hydrocarbon wax in various different manners, but also well comparable to many conventional oxygen-containing waxes now in use and provided in many aspects with specific properties these conventional waxes do not possess.

The maleinized waxes of this invention produced from the mixed wax as the starting hydrocarbon wax have desirable properties different from those of maleinized waxes obtained from a saturated wax alone or an unsaturated wax alone as the starting wax or obtained by mixing together saturated and unsaturated waxes respectively maleinized and, in addition, they are also different in properties from those of waxes obtained by mixing together one hydrocarbon wax maleinized and another hydrocarbon wax unreacted, this clearly indicating that the combined use of the saturated and the unsaturated waxes as the starting wax will have synergistic effects on the resulting maleinized wax.

As previously mentioned in detail, it will be with a very low efficiency that maleic anhydride is introduced into waxes even though saturated hydrocarbon waxes such as paraffin and microcrystalline waxes be attempted to be maleinized using an organic peroxide or the like as the reaction initiator; because of this, a maleinized wax having a high saponification value is not expected to be obtained and, furthermore, brown-colored resinous materials which are presumed to consist mainly of low polymers of maleic anhydride, are produced as by-products in large amounts, the resins requiring a complicated extraction step to be removed. However, when such a saturated hydrocarbon wax is incorporated with at least 20% by weight of an unsaturated hydrocarbon wax such as a low ethylene polymer and the resulting mixture is subjected to the same reaction as above, the amount of resinous materials produced as by-products will be reduced to such an amount that an extraction step is dispensed with and the resulting maleinized wax as the main product will have a saponification value of 100 or more as required. In addition to these characteristics, the thus-obtained wax generally has high hardness and satisfactory color.

On the other hand, when an unsaturated hydrocarbon wax alone is maleinized in the same manner as above, resinous materials as by-products will be produced in a small amount because of the high reactivity of the starting wax and a wax having a high saponification value will be obtained; however, the product wax of this invention is colored red to red-brown, this coloration being presumably caused by the interaction between the maleic anhydride and the double bonds in the starting wax.

When this system is incorporated with at least 10% by weight of the saturated hydrocarbon wax as mentioned before and the resulting mixture is subjected to maleinizing reaction in the same manner as above, the reaction itself will proceed as smoothly as above with the result that a wax having a remarkably improved color and, in addition, a higher hardness is obtained.

The process of this invention when practiced, will make it possible to widely vary the resulting maleinized waxes in color, hardness, melting point, melt index and other basic properties as well as in emulsifiability, compatibility and other performances depending on purposes for which the maleinized waxes are used by varying starting saturated and unsaturated waxes in kind (or quality) and mixing ratio and will further make it possible to widely vary the resulting maleinized waxes in acid value and saponification value by varying the amount of maleic anhydride used for the maleinization.

The process for the production of oxygen-containing waxes of this invention comprises the steps of mixing 10–80 parts by weight of a hydrocarbon (petroleum fraction) wax melting in the range of 50°–85° C. with 20–90 parts by weight of a polyolefin wax having a melting point of 36°–120° C., number average molecular weight of 310–1,000 and 5–50 double bonds per 1,000 carbon atoms and then reacting 100 parts by weight of the resulting mixed wax with 3–25 parts by weight of an unsaturated polycarboxylic acid or anhydride thereof under the condition that free radicals are produced, thereby to obtain the oxygen-containing wax.

The petroleum fraction waxes which may preferably be used in this invention include paraffin wax and microcrystalline wax, and the polyolefin waxes preferably used herein include ethylene or propylene homopolymers or olefin copolymers containing ethylene and/or propylene as a structural unit. The condition under which the free radicals are produced may preferably be realized by using 0.2–5 parts by weight of an organic peroxide per 100 parts by weight of the mixed wax.

In addition, the reaction with the unsaturated polycarboxylic acid or anhydride thereof under said radical-producing condition may preferably be effected at a temperature of 120°–220° C. for 0.5–6 hours.

The organic peroxides which may be used in this invention include ditertiary-butyl peroxide, tertiary-butyl hydroperoxide, dicumyl peroxide, tertiary-butyl-cumyl peroxide, cumyl hydroperoxide, 2,5-dimethyl-2,5-di(tertiary-butylperoxy)hexane, 2,5-dimethyl-2,5-di(tertiary-butylperoxy)hexyne-3 and methyl ethyl ketone peroxide, with ditertiary-butyl peroxide being preferred. They may be used singly or jointly.

The preferable unsaturated polycarboxylic acids used herein include maleic, itaconic and citraconic acids and may be used singly or jointly.

Since the oxygen-containing waxes prepared by the process of this invention have cyclic acid anhydride groups, they may be subjected to secondary modification such as hydration ring breakage, esterification, conversion to an amide or imide, or formation of a salt with an amine or a metal by means of known chemical reaction techniques, thereby to obtain modified oxygen-containing waxes having characteristics different from those of the original ones.

The oxygen-containing waxes and their modified ones so obtained may be widely used in various fields where ordinary natural and synthetic oxygen-containing waxes may be used. Some of the fields are listed below. Since the waxes and their modified ones are hard, glossy and excellent in emulsifiability and oil retainability, they have been clarified to be an excellent material for floor polishes, car waxes, shoe creams and other polishes as well as for inks such as carbon paper inks, coating materials and sizes for fiber and paper processing. It has been found that they are suitable for use in the preparation of crayons, color pencils or master batches for dispersing pigments in plastics because of their excellent capability of dispersing dyestuffs and pigments and also found that they may be used as a lubricant for plastics processing, a releasing agent for casting, an additive for abrasives, lubricants and the like, and one of the components of wax blends because of their excellent heat resistance and high lubricating performance. As mentioned above, the maleinized waxes and the modifications thereof have been found to be widely usable.

FIG. 1 is graphs showing the variation in color and penetration of oxygen-containing waxes obtained by varying the mixing ratio between unsaturated and saturated waxes contained in the starting wax mixtures; and FIG. 2 is graphs showing the variation of the saponification value of oxygen-containing waxes of FIG. 1 and the variation of the amount of the by-products formed in the case of FIG. 1 thereby to clarify the synergistic effects obtained by the use of the starting wax mixture.

This invention will be better understood by reference to the following Examples and the process thereof will be clearly differentiated from heretofore known processes by comparison therewith.

Comparative examples 1–7

Various saturated hydrocarbon waxes of petroleum origin were attempted to be addition reacted with maleic anhdydride in the presence of an organic peroxide added. The properties of each of the starting waxes are shown in Table 1. The reaction were carried out in the following manner.

One hundred (100) grams of each of the starting waxes were introduced into a 200-c.c. flask provided with a water-cooled reflux condenser and with motor-driven stirring vanes inserted therein, after which the wax so introduced was heated to a predetermined temperature and maintained at this temperature with a mantle heater. Separately, a predetermined amount of maleic anhydride and an organic peroxide were dissolved in a solvent to form a solution which was put in a warmed dropping funnel, added dropwise to said starting wax with stirring in a fixed time and, after addition of the whole of the solution, kept stirred for another fixed time. The total of time for said addition and time for said further stirring is defined to be a reaction time in this application. After completion of the reaction, the solvent and other volatile materials were distilled off while blowing $N_2$ gas into the reaction mixture in the flask. The contents left in the flask were incorporated with methanol the volume of which was 5 times that of the contents, and the resulting mixture was heated with agitation under reflux and then allowed to stand still for cooling. The mixture so cooled was filtered to collect the precipitated solid matter which was dried thereby obtaining an oxygen-containing wax as the main product, while the filtrate obtained by said filtration was freed of the methanol by distillation thereby obtaining a brown-colored resinous material as the by-product. The by-product so obtained was generally an acidic material having a saponification value of 300–500 and presumed to be composed mainly of low polymers of maleic anhydride. However, such a by-product may, in some cases, be produced in an amount larger than that of maleic anhydride added and, therefore, the by-product undoubtedly contains a part of the components of the starting wax in some unknown form. In Comparative example 2, the maleic anhydride in particulate form was added in 4 equal portions at equal intervals without the use of any solvents, and the organic peoxide was continuously added dropwise without the use of any solvents. The reaction conditions and the results are shown in Table 2.

As is apparent from this Table, the maleinized wax obtained from the saturated wax alone as the starting wax has a saponification of not more than 30 in the case of S-1 and not more than 50 at most in the case of S-3, while in the case of using a saturated wax alone resinous by-products will be produced in large amounts and, in the case of Comparative example 2 where no solvents were used, such by-products were produced in particularly large amounts thereby hindering the reaction operation itself because of their high viscosity.

EXAMPLE 1–11

By following the same procedure of Comparative examples 1–7 except that the starting wax was incorporated with an unsaturated hydrocarbon wax, it is made possible to produce a maleinized wax having any saponification value of up to at least 100 as desired while to produce by-products in far smaller amounts. The waxes so produced had satisfactory hardness and they had a considerably improved color except those of Examples 8 and 9 in which a colored starting wax was used.

In the Comparative examples a solvent was necessitated in about the same amount as the starting wax for the purpose of permitting the reaction to proceed smoothly and inhibiting by-products from being produced, while in the Examples such purpose was attained substantially without the use of solvents and it was not necessary to raise the reaction temperature beyond 150° C. and it was possible to use a shortened reaction time.

The reaction conditions and the results are indicated in Table 2. From comparison of the Examples with the respective corresponding Comparative examples, it is apparent that the use of the saturated and unsaturated waxes in mixture as the starting was exhibited the desirable synergistic effects in the preparation of maleinized waxes.

EXAMPLE 12

After completion of the reaction and $N_2$ gas blowing under the conditions as indicated in Table 2, the resulting product was divided into two equal portions, one of the portions being directly analyzed while the other analyzed after extraction thereof with methanol. The thus obtained result when calculated, showed that 0.6 g in total of the by-products was produced in the reaction. The analysis of both the portions were quite identical with each other, whether the by-products were previously removed or not, as shown in Table 2.

It has been proved that reduction of the amount of by-products produced to such a level as above will render it possible to omit the troublesome extraction step in obtaining a modified or maleinized wax having the same properties as those otherwise obtained.

Comparative examples 8–9

The same procedure as in the Examples was followed except that the ethylene polymer wax (U-1) as used in Examples 1–7 and Examples 10–12 was used alone, with the results being shown in Table 2.

As is apparent from Comparative example 8 and Example 6, the same reaction conditions were employed in these two cases, however, the use of a mixture of saturated and unsaturated waxes (such a mixture being hereinafter referred to as a "wax mixture" for brevity) in Example 6 resulted in the production of a product wax having a high saponification value as compared with the use of an unsaturated wax in Comparative example 8, this proving that the use of the wax mixture exhibited higher reactivity. The product wax in Example 6 is approximately identical in other properties with that in Comparative example 8 and the former is somewhat higher in hardness than the latter. The above results conspicuously indicate such effects that the use of an unsaturated wax as the starting wax will result in producing a softer product wax while the use thereof in combination with a sparingly reactive paraffin wax (S-1) will result in the production of a product wax improved over the former. In order to make said effects clearer, there is presented FIG. 1 including even experimental results which are not described in Table 2. The reaction conditions in FIG. 1 were as follows.

| Starting materials | U-1 + S-1 | 100 part(s) by weight |
|---|---|---|
|  | Maleic anhydride | 10 part(s) by weight |
|  | DTBP | 1 part(s) by weight |
| Solvent 150° C. | xylene | 5 part(s) by weight |
| Time for adding dropwise | 0.5 hr |  |
| Total reaction time | 1 hr |  |

In Comparative example 9, a wax U-1 was used as the starting wax in an attempt to obtain a product wax having a high saponification value, with the result that the product wax exhibited high viscosity approximating to that of a gel.

Comparative examples 10–13

A maleinization reaction may be effected without the use of a reaction initiator if an unsaturated wax is used as the starting material. This reaction is advantageous in that it does not produce particularly remarkable by-products; however, it is disadvantageous that it requires as long as at least 4 hours to be effected even at at least 220° C. and that it produces a remarkably colored product wax as is seen from Table 2.

Comparative examples 14–15

In each of Examples 1–11, a mixture of a highly reactive unsaturated hydrocarbon wax and a springly reactive saturated hydrocarbon wax was maleinized to obtain a desired oxygen-containing wax having properties as shown in Table 2. In such a reaction system as this, an unsaturated hydrocarbon wax is easily presumed to be mainly maleinized. Thus, for comparison, an oxygen-containing wax prepared by maleinizing an unsaturated hydrocarbon wax alone, was mixed with a saturated hydrocarbon wax such as paraffin to obtain a wax mixture. Table 3 shows the results obtained by comparison of the properties between the desired oxygen-containing wax and the comparative wax mixture.

In order to obtain a saponification value of at least 50 on such a wax mixture as above, an oxygen-containing wax, as one component of the mixtures, prepared by maleinizing an unsaturated hydrocarbon wax alone is required to have a saponification value of at least 100; however, since the oxygen-containing waxes having such a high saponification value have unsatisfactory color and high melt index, they will not be expected to have satisfactory properties as exhibited by the desired oxygen-containing waxes in the Examples even if their saponification values be at the same level as those of the desired waxes.

EXAMPLE 13

In the Example, the use of a low melting paraffin wax as the saturated hydrocabon wax component of the starting wax mixture resulted in the production of a maleinized wax having suitable hardness and other satisfactory properties (Table 2).

EXAMPLE 14

The use of a very low molecular weight polymer of ethylene containing partly an oily component (U-2) as the unsaturated hydrocarbon wax component of the starting wax mixture resulted in the production of a product wax which was somewhat soft, nearly pure white in color and the same in other properties as satisfactory oxygen-containing waxes.

EXAMPLE 15

There was prepared an aqueous emulsion containing the product wax of Example 15 in Table 2 as one component thereof. The formulation of the emulsion was as follows.

| Product wax of Example 15 | 6 | parts by weight |
|---|---|---|
| S-1 (paraffin wax 140° F.) | 6 | " |
| Nonion emulsifier |  |  |
| Polyoxyethylene 10 molecule oleyl ether | 0.9 | " |
| Polyoxyethylene 20 molecule oleyl ether | 2.6 | " |
| Water | 84.5 | " |

The preparation of the emulsion was effected in accordance with an ordinary emulsification method comprising melting and mixing under agitation the whole of the solid ingredients of the starting materials and then slowly adding boiling water to the resulting mixture.

The emulsion so prepared was a semi-transparent, low viscous liquid emitting pale fluorescence and exhibited a light transmittancy of 25% at a wavelength of 5,500 A (green) and a light passage of 10 mm when subjected to visible light absorption spectrometry. After having been allowed to stand at room temperature for two weeks, it was again measured for light transmittancy with the result that it still showed a light transmittancy of 25%, this proving it to be highly stable. A slide glass was dipped in the emulsion and dried to form a perfectly transparent wax film thereon. The wax film-covered slide glass had a light trasmittancy (while light) of 100% in comparison with a non-treated slide glass of the same type as the reference and, thus, it showed it was perfectly transparent. In addition, it was impossible to make on the thin wax film a scratch which was detectable with naked eye by scrubbing the film with a nail.

From the foregoing it has been found that the oxygen-containing waxes of this invention have satisfactory emulsifiability and are capable of forming a light transmissible emulsion even after incorporation with paraffin wax in an amount equal to that of the oxygen-containing wax, and that films formed by drying the emulsion are also transparent and tough. The oxygen-containing waxes are useful as material for various aqueous polishes, sizes for processing paper and fibers, and aqueous coating materials.

Table 1

Properties of Starting Hydrocarbon Waxes

| Property | S-1 | S-2 | S-3 | U-1 | U-2 | U-3 | U-4 |
|---|---|---|---|---|---|---|---|
| Description of Wax | Saturated hydrocarbon Paraffin 140° F. | Saturated hydrocarbon Paraffin 125° F. | Saturated hydrocarbon Microcrystalline 155° F. | Ethylene polymer | Ethylene polymer | Ethylene polymer | Ethylene 93% Propylene 7% |
| Melting point °C. (ASTM D-127) | 60 | 52 | 68 | 80 | 39 | 87 | 83 |
| Penetration (ASTM D-1321) | 15 | 21 | 18 | 11 | >80 | 15 | 25 |
| Color (Gardner number) (ASTM D-1544) | <1 | <1 | <1 | 1 | 1 | 7 | 7 |
| Average molecular weight | 410 | 360 | 480 | 460 | 320 | 560 | 560 |
| Average number of carbon atoms | $C_{29}$ | $C_{26}$ | $C_{34}$ | $C_{33}$ | $C_{23}$ | $C_{40}$ | $C_{40}$ |
| Amount of double bonds (No. of double bonds per 1000 carbon atoms) | 0 | 0 | 0 | 32 | 42 | 16 | 16 |
| Kind of double bond | — | — | — | Terminal Vinyl 78% Vinylidene 18% Body Vinylene 4% | Vinyl 88% Vinylidene 11% Vinylene 1% | Vinyl 3% Vinylidene 5% Vinylene 92% | Vinyl 3% Vinylidene 5% Vinylene 92% |

Table 2

Maleinization

| | Reaction conditions | | | | | | | Properties of products | | | | |
|---|---|---|---|---|---|---|---|---|---|---|---|---|
| | Kind and mixing ratio of starting wax(es) (Note 1) | Amount of maleic anhydride (Note 2) | Kind and amount of peroxide (Note 3) | Kind and amount of solvent (Note 4) | Reaction temperature °C. | Addition time hr | Total reaction time hr | Saponification value (Note 5) | Penetration (Note 6) | Color (Note 7) | Amount of by-products (Note 8) | (Note 9) |
| Comparative example 1 | S-1, 100 | 10 | DTBP, 4 | DCB, 100 | 185 | 2 | 2 | 30 | 9 | 7 | 15 | |
| Comparative example 2 | " | " | DTBP, 2 | None | " | 5 | 5 | 15 | 10 | 8 | 17 | |
| Comparative example 3 | " | " | DTBP, 2 | X, 100 | 150 | 0.5 | 4 | 9 | 9 | " | 7 | |
| Comparative example 4 | " | " | DCP, 2 | X, 100 | " | 4 | " | 4 | 10 | 7 | 16 | |
| Comparative example 5 | " | " | DTBP, 1 | X, 5 | " | 0.5 | 1 | 1 | 9 | 1 | 7.5 | |
| Comparative example 6 | S-3, 100 | " | DTBP, 2 | X, 100 | " | 3 | 4 | 14 | 8 | 8 | 11 | |
| Comparative example 7 | S-3, 100 | 17 | DTBP, 3 | DCB, 100 | 185 | 2 | 4 | 49 | 7 | 9 | 16 | |
| Ex. 1 | S-1, 50 U-1, 50 | 10 | DTBP, 2 | T, 5 | " | 0.5 | 1.5 | 61 | 0.5 | 5 | 1.7 | |
| Ex. 2 | S-1, 70 U-1, 30 | " | DTBP, 2 | T, 5 | " | " | " | 53 | " | " | 2.0 | |
| Ex. 3 | S-1, 30 U-1, 70 | " | DTBP, 2 | T, 5 | " | " | " | 59 | " | " | 0.9 | |
| Ex. 4 | S-1, 50 U-1, 50 | " | DTBP, 0.5 | T, 5 | " | " | 2 | 66 | " | 5 | " | |

Table 2-continued

| | Reaction conditions | | | | Maleinization | | | Properties of products | | | | |
|---|---|---|---|---|---|---|---|---|---|---|---|---|
| | Kind and mixing ratio of starting wax(es) (Note 1) | Amount of maleic anhydride (Note 2) | Kind and amount of peroxide (Note 3) | Kind and amount of solvent (Note 4) | Reaction temperature °C. | Addition time hr | Total reaction time hr | Saponification value (Note 5) | Penetration (Note 6) | Color (Note 7) | Amount of by-products (Note 8) | (Note 9) |
| Ex. 5 | S-1, 70 U-1, 30 | " | DTBP, 0.5 | T, 5 | " | " | 1 | 61 | 2.5 | 7 | 2.5 | |
| Ex. 6 | S-1, 70 U-1, 30 | 10 | DTBP, 1 | X, 5 | 150 | 0.5 | 1 | 67 | 1.0 | 4 | 0.8 | |
| Ex. 7 | S-1, 50 U-1, 50 | 20 | DTBP, 1 | X, 5 | 185 | " | " | 122 | 0.5 | 9 | 2.2 | |
| Ex. 8 | S-1, 50 U-3, 50 | 10 | DTBP, 1 | X, 5 | 150 | " | " | 45 | 1 | 11 | 4.4 | |
| Ex. 9 | S-1, 50 U-1, 50 | " | DTBP, 1 | X, 5 | " | " | " | 58 | 1.5 | 6 | 1.2 | |
| Ex. 10 | S-3, 50 U-1, 50 | " | DTBP, 2 | T, 5 | 185 | " | 2 | 53 | 1 | 5 | 0.8 | |
| Ex. 11 | S-3, 70 U-1, 30 | " | DTBP, 2 | T, 5 | " | " | " | 50 | 1 | 6 | 3.4 | |
| Ex. 12 | S-1, 50 U-1, 50 | 10 | DTBP, 1 | T, 5 | 185 | 0.5 | 1.5 | 54 / 54 | 0.5 / 0.5 | 4 / 4 | 0.6 | Methanol extraction omitted |
| Comparative example 8 | U-1, 100 | " | DTBP, 1 | X, 5 | 150 | " | 1 | 50 | 1.5 | 4 | 0.6 | |
| Comparative example 9 | " | 20 | DTBP, 2 | T, 5 | 185 | " | 1 | 107 | " | 7 | — | Methanol extraction omitted, High viscosity |
| Comparative example 10 | U-1, 100 | 12 | None | None | 250 | — | 4 | 82 | 4 | 11 | — | Methanol extraction omitted |
| Comparative example 11 | U-3, 100 | " | " | " | 225 | — | 4 | 62 | 9 | 10 | — | Methanol extraction omitted |
| Comparative example 12 | U-3, 100 | " | " | " | 225 | — | 8 | 75 | 7 | 12 | — | Methanol extraction omitted |
| Comparative example 13 | U-1, 100 | 20 | " | " | 250 | — | 4 | 125 | 2.5 | 15 | — | Methanol extraction omitted |
| Ex. 13 | S-2, 50 U-1, 50 | 10 | DTBP, 1 | X, 5 | 150 | 0.5 | 1 | 59 | 1.5 | 4 | 0.7 | Methanol |
| Ex. 14 | S-1 50 U-2, 50 | 10 | DTBP, 1 | X, 5 | 150 | 0.5 | 1 | 61 | 15 | 2 | 1.3 | |
| Ex. 15 | S-1, 50 U-1, 50 | 15 | " | " | " | 1 | 1.5 | 95 | 0.5 | 5 | 1.0 | |

Note 1: Refer to Table 1 for starting wax or waxes.
Notes 2, 3, 4 and 8: Amount is indicated by "parts by weight/100 parts by weight of total of starting wax or waxes".
Note 3: DTBP stands for ditertiary-butyl peroxide. DCP stands for dicumyl peroxide.
Note 4: X stands for mixed xylenes. DCB stands for ortho-dichlorobenzene. T stands for tetralin.
Note 5: ASTM D 1387 (KOH mg/g wax)
Note 6: ASTM D 1321 (25° C., 100 g, 5 seconds)
Note 7: ASTM D 1544 (Gardner number)
Note 8: Methanol-soluble matter
Note 9: After completion of maleinization, two layers formed, the upper one of the layers being a light yellow liquid composed mainly of principal product and the lower one being a yellow-brown viscous liquid composed mainly of by-products.

Table 3

| | Properties of Mixture of Maleinized Wax and Starting Wax | | | | |
|---|---|---|---|---|---|
| | Composition of mixture | | Saponification value | Penetration | Color |
| Comparative example 14 | Product wax of Comparative example 9 S-1 | 50 50 | 54 | 2.5 | 6 Highly viscous |
| Comparative | Product wax of Comparative | | | | |

Table 3-continued

| | Properties of Mixture of Maleinized Wax and Starting Wax | | | | |
|---|---|---|---|---|---|
| | Composition of mixture | | Saponification value | Penetration | Color |
| example 15 | example 13 | 50 | | | |
| | S-1 | 50 | 69 | 5.5 | 13 | — |

What is claimed is:

1. A process for preparing an oxygen-containing wax by mixing 10–80 parts by weight of a saturated petroleum fraction wax melting in the range of 50°–85° C. with 20–90 parts by weight of an unsaturated polyolefin wax having a melting point of 36°–120° C., a number average molecular weight of 310–1,000 and 5–50 double bonds per 1,000 carbon atoms to form a wax mixture and then reacting 100 parts by weight of the thus-formed wax mixture with 3–25 parts by weight of an unsaturated polycarboxylic acid or anhydride thereof in the presence of an organic peroxide, thereby to prepare the oxygen-containing wax.

2. A process according to claim 1, wherein the petroleum fraction wax is paraffin wax.

3. A process according to claim 1, wherein the petroleum fraction wax is microcrystalline wax.

4. A process according to claim 1, 2 or 3, wherein the polyolefin wax is an ethylene or propylene homopolymer.

5. A process according to claim 1, 2 or 3, wherein the polyolefin wax is an olefin copolymer containing at least one kind selected from the group consisting of ethylene and propylene structural units.

6. A process according to claim 1, wherein the organic peroxide is present in an amount of 0.2–5 parts by weight per 100 parts by weight of the wax mixture.

7. A process according to claim 6, wherein the organic peroxide is at least one member selected from the group consisting of ditertiary-butyl peroxide, tertiary-butyl hydroperoxide, dicumyl peroxide, tertiary-butyl-cumyl peroxide, cumyl hydroperoxide, 2,5-dimethyl-2,5-di(tertiary-butylperoxy)hexane, 2,5-dimethyl-2,5-di(tertiary-butylperoxy)hexyne-3 and methyl ethyl ketone peroxide.

8. A process according to claim 6, wherein the organic peroxide is ditertiary-butyl peroxide.

9. A process according to claim 1, 2 or 3, wherein the unsaturated polycarboxylic acid is at least one member selected from the group consisting of maleic, itaconic and citraconic acids and anhydrides thereof.

10. A process according to claim 4, wherein the unsaturated polycarboxylic acid is at least one member selected from the group consisting of maleic, itaconic and citraconic acids and anhydrides thereof.

11. A process according to claim 5, wherein the unsaturated polycarboxylic acid is at least one member selected from the group consisting of maleic, itaconic and citraconic acids and anhydrides thereof.

12. A process according to claim 1, wherein the unsaturated polycarboxylic acid or anhydride thereof is maleic acid or maleic anhydride.

13. A process according to claim 1, 2 or 3, wherein the reaction is effected at 120°–220° C. for 0.5–6 hours.

14. A process according to claim 4, wherein the reaction is effected at 120°–220° C. for 0.5–6 hours.

15. A process according to claim 5, wherein the reaction is effected at 120°–220° C. for 0.5–6 hours.

16. A process according to claim 6 or 7, wherein the reaction is effected at 120°–220° C. for 0.5–6 hours.

17. An oxygen-containing wax obtained by the process of claim 13.

* * * * *